United States Patent
US 6,906,264 B1
Grant, Jr. et al.
Jun. 14, 2005

(54) COLOR-CODED ARMORED CABLE

(75) Inventors: Edwin H. Grant, Jr., Carrollton, GA (US); William K. Hardin, Carrollton, GA (US); David B. McCardel, Marietta, GA (US); Richard R. Miller, Carrollton, GA (US)

(73) Assignee: Southwire Company, Carrollton, GA (US)

( * ) Notice: Subject to any disclaimer, the term of this patent is extended or adjusted under 35 U.S.C. 154(b) by 0 days.

(21) Appl. No.: 10/870,169

(22) Filed: Jun. 17, 2004

(51) Int. Cl.[7] ................................................ H01B 7/20
(52) U.S. Cl. ................ 174/112; 174/102 R; 174/102 D
(58) Field of Search ............................ 174/102 R, 112, 174/108, 109, 102 D

(56) References Cited

U.S. PATENT DOCUMENTS

| | | |
|---|---|---|
| 840,766 A | 1/1907 | Greenfield |
| 951,147 A | 3/1910 | Porter |
| 1,781,574 A | 11/1930 | Frederickson |
| 1,995,407 A | 3/1935 | Walker |
| 2,070,679 A | 2/1937 | Pebock et al. |
| 2,086,152 A | 7/1937 | Bedell |
| 2,106,048 A | 1/1938 | Candy, Jr |
| 2,234,675 A | 3/1941 | Johnson et al. |
| 3,720,747 A | 3/1973 | Anderson et al. |
| 4,021,315 A | 5/1977 | Yanagida et al. |
| 4,029,006 A | 6/1977 | Mercer et al. |
| 4,161,564 A | 7/1979 | Legbandt |
| 4,778,543 A | 10/1988 | Pan |
| 4,875,871 A | 10/1989 | Booty, Sr. et al. |
| 4,997,994 A | 3/1991 | Andrews et al. |
| 5,340,326 A | 8/1994 | LeMaster |
| 5,350,885 A | 9/1994 | Falciglia et al. |
| 5,468,914 A | 11/1995 | Falciglia et al. |
| 5,557,071 A | 9/1996 | Falciglia et al. |
| 5,708,235 A | 1/1998 | Falciglia et al. |
| 5,719,353 A | 2/1998 | Carlson et al. |

FOREIGN PATENT DOCUMENTS

| | | |
|---|---|---|
| DE | 1902057 | 8/1964 |
| DE | 4016445 | 8/1991 |
| GB | 194419 B1 | 3/1923 |
| GB | 332303 | 7/1930 |
| GB | 913514 | 12/1962 |
| GB | 1117862 | 6/1968 |
| GB | 1432548 | 4/1976 |
| GB | 2154785 A | 9/1985 |
| JP | 49 20780 | 2/1974 |
| JP | 52-121679 | 10/1977 |
| JP | 55-120031 | 9/1980 |
| JP | 57-143379 | 9/1982 |
| JP | 57198510 | 5/1984 |
| JP | 60-097179 | 5/1985 |
| JP | 64-81113 | 3/1989 |
| JP | 1-134808 | 5/1989 |
| JP | 3-25806 | 2/1991 |
| JP | 01-312043 | 7/1991 |
| JP | 03-173015 | 7/1991 |
| JP | 04-163048 | 6/1992 |
| JP | 04-312850 | 11/1992 |

*Primary Examiner*—Chau N. Nguyen
(74) *Attorney, Agent, or Firm*—Gardere Wynne Sewell LLP

(57) ABSTRACT

A color coded flexible armored cable includes a tubular sheath formed from a metal strip having a continuous, non-patterned, non-conductive color coating applied to the entirety of an abraded outer surface of the strip. The color coating is of a predetermined precise thickness and includes a polyethylene based wax lubricant in a percent by volume of about 0.45 to 0.55. The strip is formed into helical convolutions having a cross-sectional shape which provides for overlap and interlocking of adjacent convolutions and contact between adjacent convolutions along a helical line such that, upon bending the sheath, the convolutions remain in contact at a trailing edge of one convolution and the inner surface of an adjacent convolution in a way such that the color coating is not scraped off of the outer surface of the sheath. The sheath is preferably formed such that the number of convolutions per unit length of sheath is maximum for sheath flexibility and retention of the coating on the outer surface of the sheath.

31 Claims, 5 Drawing Sheets

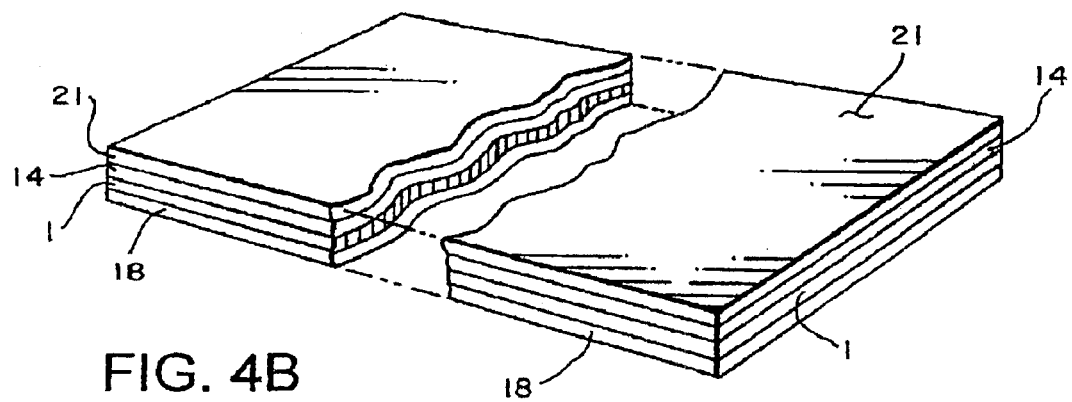
FIG. 4B
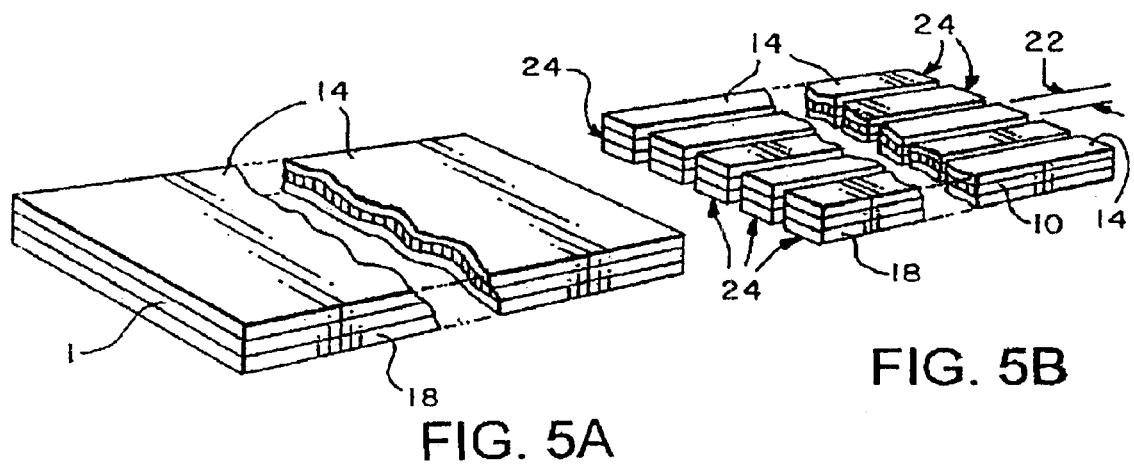
FIG. 5A
FIG. 5B
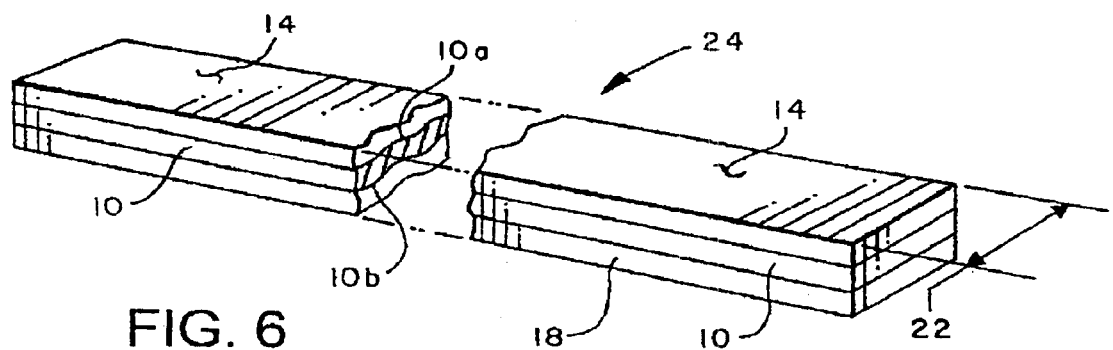
FIG. 6

COLOR-CODED ARMORED CABLE

BACKGROUND OF INVENTION

The present invention relates to the general field of visually coded electrical conductors and cable, more particularly to the field of visually coded armored cable, and even more particularly to a new and improved version of color-coded armored cable.

Visual coding of electrical conductors and cable to distinguish their electrical properties, intended use, or other characteristics has been a long time practice. Such coding has typically used, for example, alpha-numeric stamping, varied marking patterns, or specific colors or color combinations, to respectively distinguish the electrical characteristics, application, or the like, of the conductors or cable. Such coding is represented by industry practices and documented in patents dating back at least as early as the 1900s. Examples of these patents are U.S. Pat. No. 951,147, issued Mar. 8, 1910; U.S. Pat. No. 2,106,048, issued Jan. 18, 1938; U.S. Pat. No. 3,720,747, issued Mar. 13, 1973; and U.S. Pat. No. 5,340,326 (FIG. 8), issued Aug. 23, 1994.

A particular type of cable known as armored cable has been in use for many decades. Metal clad armored cable comprises an elongated outer sheath of metal, primarily for the mechanical protection of the insulated conductors which extend through the inner passageway defined by the sheath. The metallic sheath is typically formed by a helically wound strip with adjacent convolutions overlapping and interlocking with one another to provide a flexible metal conduit that facilitates the electrical conductor installation process and the particular routing of conductors.

Given that visual coding of other type of cable had already become commonplace, it was then not surprising that visual coding, including color coding, of armored cable also became a common practice in the United States and elsewhere. This is reflected not only by industry adoption of color-coding of armored cable at least as early as the 1980s using, for example, paint applied to, or colored jackets surrounding, the cable sheath, but also by many disclosures of such approach in the patent literature.

For example, British patent specifications GB 194,419 (1923); U.S. Pat. No. 1,117,862 (1968); and U.S. Pat. No. 1,432,548 (1976) all disclose visual coding of armored cable. U.S. Pat. No. 4,875,871, issued Oct. 24, 1989, discloses color coding of various modular components of an electrical network including, significantly, color coding of flexible metal clad armored cable (FIG. 17c). A "family" of interrelated patents owned by WPFY Inc., namely U.S. Pat. Nos. 5,350,885; 5,468,914; 5,557,071; and 5,708,235 (re-issued as Re 38,345), all disclose various versions of color-coded armored cable, particularly those in which different patterns of visible indicia, i.e., predetermined arrangements of discrete markings, particularly color, have been selectively applied to the surface of the armored cable sheath. The selective application of the color pattern leaves exposed, as bare metal, preselected portions of the "crowns" and "valleys" of the cable sheath. The result is a difference of visual appearances, or duality of contrast, between the exposed metal portions and the pattern of colored indicia.

Unfortunately, prior color-coding techniques for armored cable, and the resulting color-coded armored cable, have substantial disadvantages associated with them. For example, use of color patterns or other types of visible indicia as the means for color-coding, like that described and claimed in the above-described family of WPFY patents, while admittedly artistic, can be distractions from the primary objective that the color-coding is intended to achieve—namely, the immediate and readily understood "decoding" or identification of the type and application of the particular coded armored cable. Additionally, the requirement that the color coating leave portions of the surface of the metal sheath exposed is not only unnecessary from an electrical standpoint, but results in a needless processing expense and could cause the sheath to be susceptible to corrosion. Furthermore, to the extent that industry has recognized these problems and adopted a solid, continuous, (rather than patterned) color-coding approach, the full benefits and advantages of this approach have not yet been achieved. For example, when using a continuous solid color coating applied to the cable sheath, unless the color coating has a high degree of retention to the surface of the sheath, the full benefit of this approach may not be realized.

It is therefore a principal object of the present invention to provide a new and improved version of color-coded armored cable substantially different from any prior approach, and one that provides an easily identifiable, efficient and durable identification system. It is another object of the present invention to provide an improved color-coded armored cable which avoids the disadvantages of one that has indicia or patterns applied to the outer surface of the metal sheath. It is another object to avoid the disadvantages associated with a color coding technique which requires exposed areas of bare metal on the surface of the cable sheath. It is a still further object of the invention to provide a new and improved version of solid color-coded armored cable, meeting the aforementioned objects.

SUMMARY OF THE INVENTION

In accordance with the above noted and other objects, the present invention provides an improved color-coded armored cable of a type in which the entire outside observable metallic surface of the cable sheath formed by a helically wound metal strip is covered with a solid, visually continuous non-patterned, preferably non-conductive, coating of material the coating being of a color which visually distinguishes the cable from others having different electrical properties, intended uses or applications, and/or other defined characteristics.

In accordance with important aspects of the invention, the longevity of retention of the non-patterned color coating to the observable outer surface of the metallic sheath is enhanced by incorporating the synergistic combination of features of an abraded metallic surface, a precise thickness of color coating, a polyethylene based lubricant of specific volumetric percentage incorporated into the color coating, and a specific profile shape and optimum number of convolutions of the helically wound metallic strip forming the cable sheath. An additional translucent coating is optionally disposed over the color coating.

In accordance with further aspects of the invention, the so-constructed color-coded armored cable is provided with a coating, preferably conductive, disposed over the interior surface of the cable sheath to facilitate fabrication of color-coated metal strips which form the sheath and to minimize damage to the color coating during handling of the metal strip. Moreover, the configuration and number of the sheath convolutions are such that the convolutions cooperate with one another in a way which provides good sealing contact between adjacent convolutions but will avoid undermining the retention of the color coating from the coated strips when the strip convolutions are moved relative to one another. The sheath also includes a maximum number of convolutions per unit length of the sheath to not only improve the bendability of the sheath, and to provide good electrical contact between the sheath and fittings to which the cable may be connected, but to be consistent with the overall objective of the invention—to enhance the longevity of retention of the color coating to the sheath surface by minimizing the degree of movement (and therefore potential scraping) of adjacent coated strip convolutions with respect to one another.

For a more complete understanding of the above mentioned and other features and advantages of the present invention, reference is now made to the detailed description of the invention along with the accompanying drawings, in which corresponding numerals in the different drawings refer to corresponding parts, in which the drawing figures are not necessarily to scale and may have certain portions exaggerated or shown in somewhat generalized or schematic form for purpose of clarity of description.

BRIEF DESCRIPTION OF THE SEVERAL VIEWS OF THE DRAWINGS

FIG. 4B is a perspective view of a coated metal sheet showing an optional coating disposed over the color coating;

FIG. 5A is a perspective view of the coated metal sheet before a slitting process;

FIG. 5B is a perspective view showing strip segments formed from the coated metal sheet after the slitting process;

FIG. 6 is a perspective view on a larger scale of one of the coated metal strip segments of FIG. 5B;

DETAILED DESCRIPTION OF THE PREFERRED EMBODIMENTS

Figure 1:
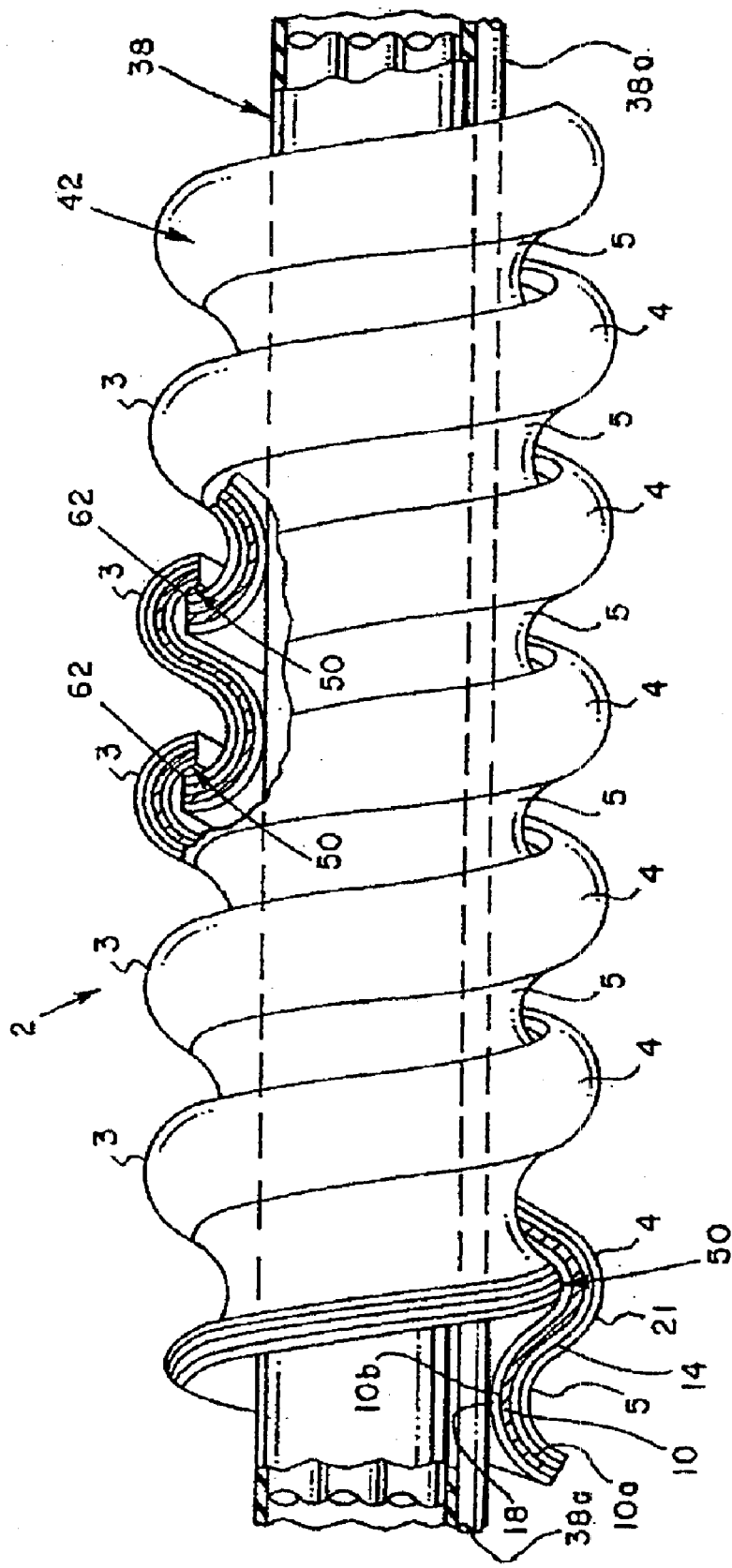
FIG. 1 is a longitudinal side elevation of a preferred embodiment of a color coded armored cable in accordance with the invention in which portions of the cable sheath are shown in section to illustrate its construction.

Referring initially to FIG. 1, there is depicted a new and improved color-coded armored cable assembly 2 in accordance with the present invention. The cable assembly 2 comprises a color coded tubular metallic sheath 42 enclosing a set 38 of insulated conductors extending through the interior passageway defined by the sheath 42. In the case of a Type AC armored cable, the conductor set 38 includes an uninsulated ground or bond wire 38a operable, if desired, to make contact with an inner wall surface of sheath 42, particularly an electrically conductive contact when this surface is uncoated or coated with a conductive coating. However, the improvements of this invention are also applicable to other types of metal clad armored cable, including Type MC armored cable, in which the ground wire is an insulated conductor. The sheath 42 is formed of a helically wound, uniquely contoured metal strip 10, preferably of aluminum, which has been color coated in a manner subsequently described herein. Each convolution 3 of the strip interlocks with its adjacent convolution at an overlap or interlock 50, with uniformly spaced "crowns" 4 and "valleys" 5 defining the outer surface of the sheath 42, as illustrated in FIG. 1.

Figure 8A:
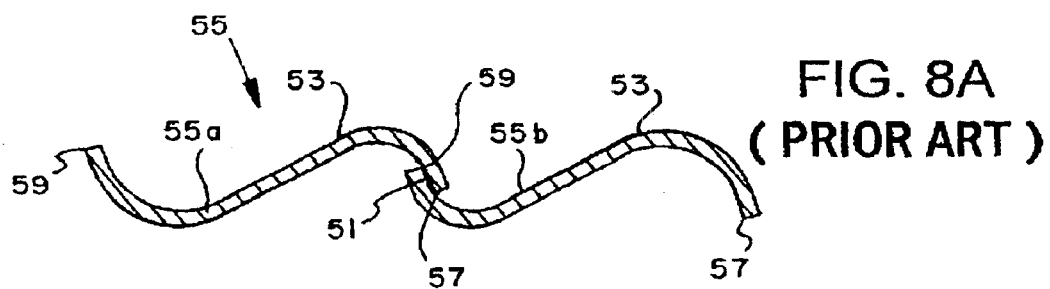
FIG. 8A is a detail longitudinal section view showing the manner of interlocking adjacent convolutions of a prior art armored cable sheath.
Figure 8B:
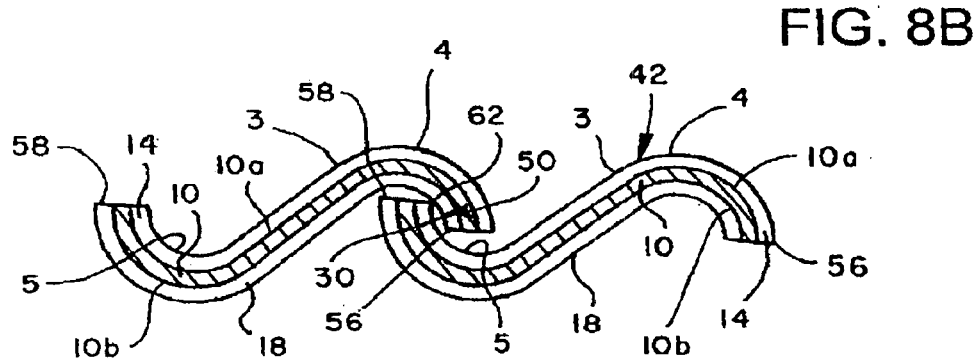
FIG. 8B is a detail longitudinal section view showing the manner of interlocking the convolutions of an armored cable sheath in accordance with the invention.

The metal strip 10 includes an outer surface 10a and an opposite inner surface 10b, see FIGS. 6 and 8B also. A coating 14 of non-conductive material, preferably non-conductive paint, of a desired color, is applied over the entire outer surface 10a of the strip 10, preferably to a dry film thickness (DFT) in the range of 0.3 mils to 0.4 mils DFT. As a consequence, the finally formed sheath 42 will essentially have the entirety of its outer or exterior observable surface of the chosen color. This color is chosen to uniquely identify the particular armored cable and distinguish it from others, for example by electrical properties, intended use, or other characteristics. The inner surface 10b of the metal strip 10 has a clear coating 18 applied thereto and which is, preferably, electrically conductive, but alternately may be non-conductive. Thus, the entirety of the inner or interior surface of the cable sheath 42 may be covered by this coating 18 which, if conductive, enables electrically conductive contact between coating 18 and wire 38a, FIG. 1. Notwithstanding the conductivity of coating 18, this coating advantageously minimizes damage to the coating 14 when strip 10 is provided in coils and when uncoiled while being formed into the sheath 42. Coating 18 may be formed of a non-pigmented polyester based paint, is preferably applied to a thickness of about 0.2 mils to 0.3 mils DFT, and also provides some lubricity during the strip forming process.

In accordance with an alternate embodiment of the invention, a translucent or transparent coating or layer 21, is applied over the coating 14 to assist in the retention of the coating 14 to the sheath surface 10a. This translucent layer or coating 21 may be paraffin, lanolin or water based. In accordance with a preferred embodiment, coating 21 is an acrylic wax.

Figure 2:
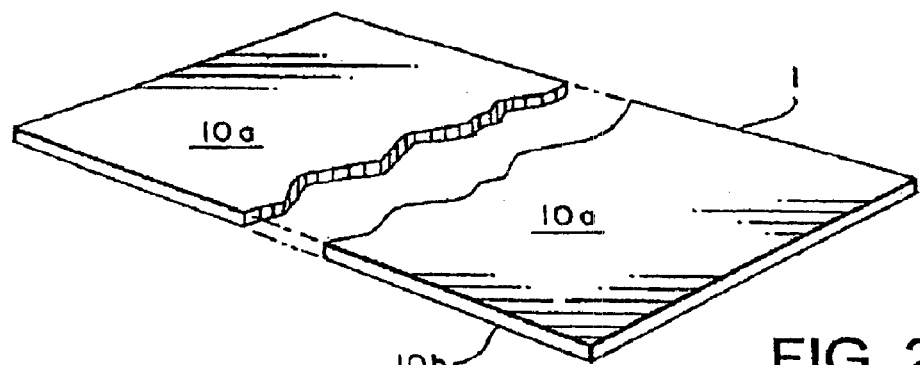
FIG. 2 is a perspective view of an untreated metal sheet to be formed into the desired cable sheath construction shown in FIG. 1.

There is now described a preferred method of producing the color-coded armored cable 2 of FIG. 1. Referring initially to FIG. 2, there is depicted an untreated elongated sheet 1 of metal, preferably aluminum, but also optionally of any other suitable metal, such as low carbon steel. Metal sheet 1 preferably has a thickness of about 25.0 mils. An initial processing step involves abrading the surfaces of the sheet, particularly the surface 10a upon which color coating 14 is to be applied. Accordingly, for this purpose, the metal sheet 1 may be chemically abraded whereby, after an initial sequence of caustic baths and rinses, the sheet is subjected to an acidic solution or metal etching bath which results in the desired abrading of sheet surfaces 10a and 10b. Alternatively, the surfaces 10a and 10b may be mechanically abraded.

Figure 3:
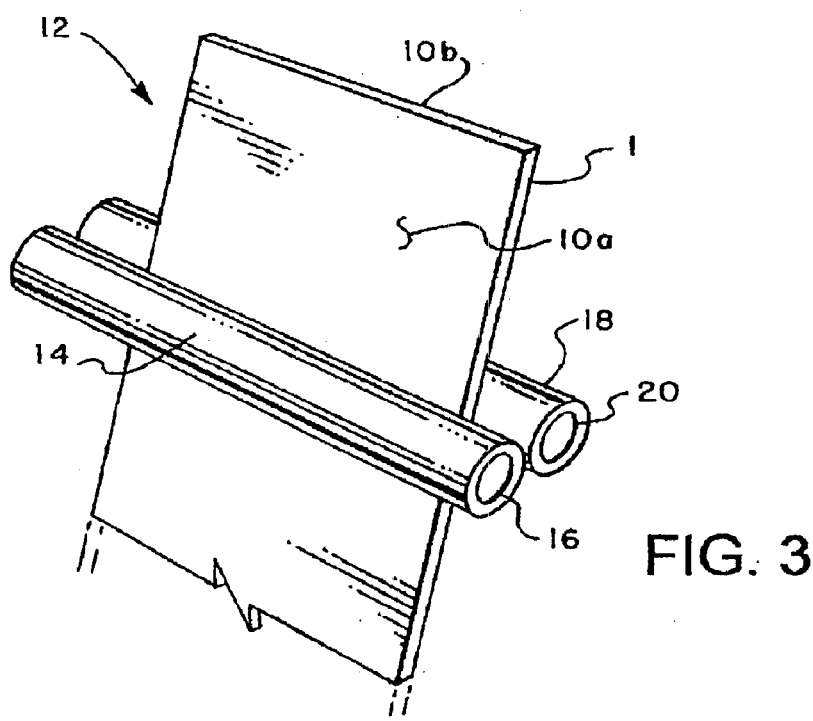
FIG. 3 is a detail perspective view in somewhat schematic form of an apparatus for coating the metal sheet of FIG. 2.

Referring now to FIG. 3, the abraded metal sheet 1 is next passed through a coating application apparatus 12 comprising rotating rollers 16 and 20 which are adapted to respectively engage top surface 10a and opposed surface 10b of the sheet Roller 16 contains a non-conductive, colored coating material 14, preferably paint or ink, which is transferred to the entire surface 10a of the metal sheet as this sheet passes through the rollers 16 and 20, resulting in a coating 14 (FIG. 4A) of the desired color. As previously described, the color that is chosen for the coating 14 will be that color which is to identify the particular characteristic(s) of the armored cable 2. For example, according to existing convention, for AC Type armored cable intended to be used in hospital installations, the color chosen would be green. However, other solid colors, such as red or blue, may be chosen, depending upon the application or other characteristic.

In accordance with a feature of this invention, the longevity of retention of the coating 14 to the metal surface 10a is found to be enhanced due to the abrading of this surface. In addition, it has been discovered that, particularly when using a substantially non-conductive polyester based paint, by maintaining the paint coating thickness in the range of 0.3 mils to 0.4 mils DFT, paint retention to the metal is optimized.

Roller 20 contains a conductive or non-conductive coating material which is transferred to the entire opposite surface 10b of the metal sheet 1 as the sheet passes through apparatus 12, resulting in the coating 18 (FIG. 4A) preferably, as mentioned above, to a thickness in the range of 0.2 mils to 0.3 mils DFT. If coating 18 is conductive, it facilitates the grounding of AC Type armored cables in which a bare ground wire, such as wire 38a, is extending through the sheath to conductively engage the inner sheath wall. Coating 18 also reduces friction between surface 10b and tooling for fabricating the strips 10 and protects coating 14 when the strips 10 are wound into coils and when the strips are uncoiled.

In accordance with another important feature of the invention, the material of the color coating 14 preferably contains a lubricant incorporated therein. This lubricant enables increased adherence of the color coating 14 to the surface 10a of the metal sheet 1 and ultimately to the entire outer observable surface of the sheath to be formed by an elongated strip of this metal. The lubricant is preferably a polyethylene based wax, with the amount of lubricant being critical. For example, if the amount of lubricant is insufficient, it does not assist in such adherence. On the other hand, if the amount is too great, it may interfere with cable structural integrity. Accordingly, it has been determined that the percentage of the polyethylene based wax lubricant per unit volume of paint of the type described herein should be within a range of from 0.45% to 0.55% with the optimum volume percentage of the lubricant being about 0.5%.

Figure 4A:
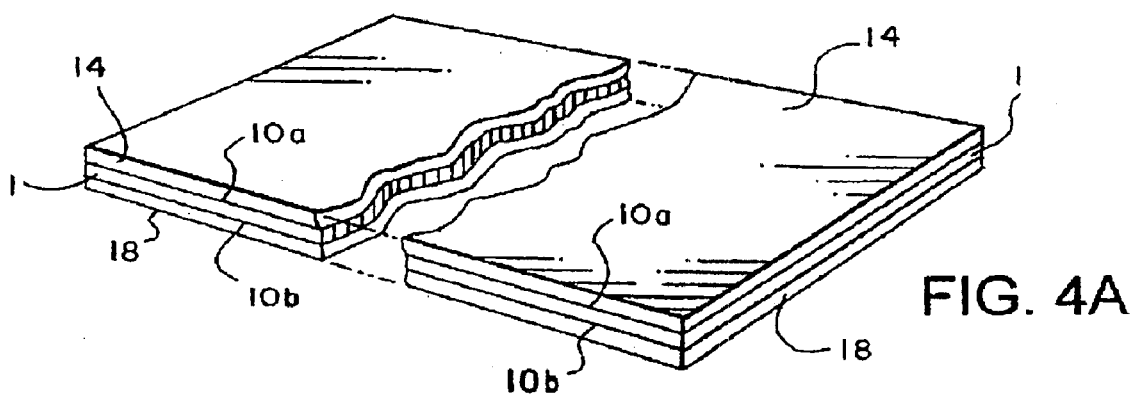
FIG. 4A is a perspective view of the coated metal sheet.

FIG. 4A depicts the metal sheet 1 after emergence from the apparatus 12. Accordingly, a coating 14 of non-conductive, colored material is disposed on surface 10a and a coating 18 of material, preferably conductive, is on the opposite surface 10b. To further promote the durability of the final product and to further assist in retaining the color coating 14 over the entire surface 10a, the metal sheet 1 may optionally have a translucent or transparent coating 21 disposed over the coating 14, as depicted in FIG. 4B. The clear or translucent coating 21 is shown in FIGS. 1 and 4B but not in the other drawing figures.

After an appropriate curing step, the coated metal sheet 1 next proceeds through a slitting process. Accordingly, utilizing a conventional slitting apparatus, not shown, the coated metal sheet 1 (FIG. 5A) is slit into a plurality of elongated coated metal strip segments 24 of desired width 22, as depicted in FIG. 5B. FIG. 6 is an illustration of one of the coated metal strip segments 24. While the width of each segment 24 will vary with the size of the sheath and number of conductors that the armored sheath is to enclose, it has been found that for most armored cable applications, the strip width 22 will normally be about 0.38 inches, 0.50 inches or 0.75 inches. Strip segments 24 are normally welded to each other end to end and formed into a coil, in a conventional manner, preparatory to use of the strip 10 in forming a sheath 42.

Figure 7:
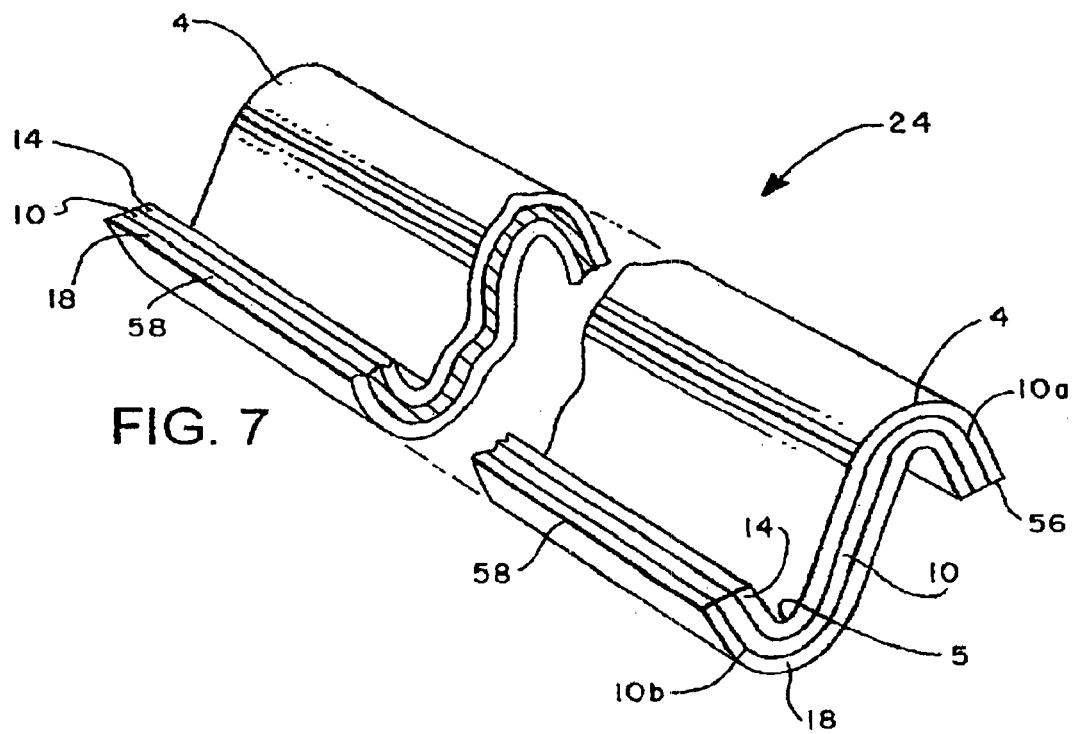
FIG. 7 is a perspective view of the coated metal strip; showing its profile after formation in a roll forming apparatus

Next in the construction of the color-coded armored cable 2 is the formation of the helically wound sheath 42. Accordingly, utilizing conventional apparatus, not shown, but known to those skilled in the art, coiled and end to end connected elongated coated metal strip segments 24, forming a continuous strip 10, are uncoiled and contoured into a profile or shape generally as shown in FIG. 7. The contoured strip 10 is formed in a continuous process which also includes forming the sheath 42. Suitable so-called strip or roll armoring apparatus for forming the contoured strip 10 and the sheath 42 is commercially available from Roteq Machinery, Inc., Concord, Ontario, Canada, although other equipment may be used. The aforementioned apparatus forms a convex surface or "crown" 4 adjacent to a concave surface or "valley" 5 along the entire length of the metal strip 10, thereby forming a contoured, coated metal strip including, for purposes of discussion herein, a so-called leading edge 56 and a so-called trailing edge 58, FIG. 7.

The strip or roll forming or armored cable forming apparatus, not shown, but of the type mentioned above, helically winds the contoured metal strip 10 around a conductor set 38 (FIG. 1) to form the metallic sheath 42 and the color-coded armored cable 2. Each successive convolution 3 winds over the previous convolution at a continuous overlap or interlock 50, see FIGS. 1 and 8B through 8D, the process continuing until the tubular metal sheath 42 is formed having the uniformly spaced crowns 4 and valleys 5.

Referring now to FIG. 8A, there is illustrated a detail longitudinal section view showing two overlapping and interlocked convolutions 53 of a prior art armored cable sheath 55. The prior art sheath 55 shown is uncoated and is formed of a continuous metal strip 55a. In the prior art sheath 55, a leading edge 57 of one convolution of the strip 55a overlaps a trailing edge 59 of an adjacent convolution and provides area contact 51 between leading and trailing edges of the successive convolutions 53, as illustrated. However, when prior art cable sheath 55 is bent during routing a cable from one point to another, sliding motion occurs between the adjacent convolutions which tends to scrape off any identifying coatings which might be applied to the outer surface 55b of the sheath. In other words, if the surface 55b were completely coated with an identifying colored paint or the like, as in the present invention, this paint would tend to be scraped off of the surface 55b in the area 51 of convolution overlap between the leading and trailing edges 57 and 59 as a consequence of relative movement between the adjacent convolutions, thus undermining the integrity of the color coating applied to surface 55b at the area of overlap, and thereby having the potential of changing the desired outer observable appearance of the sheath and exposing the sheath to possible corrosion.

Figure 8C:
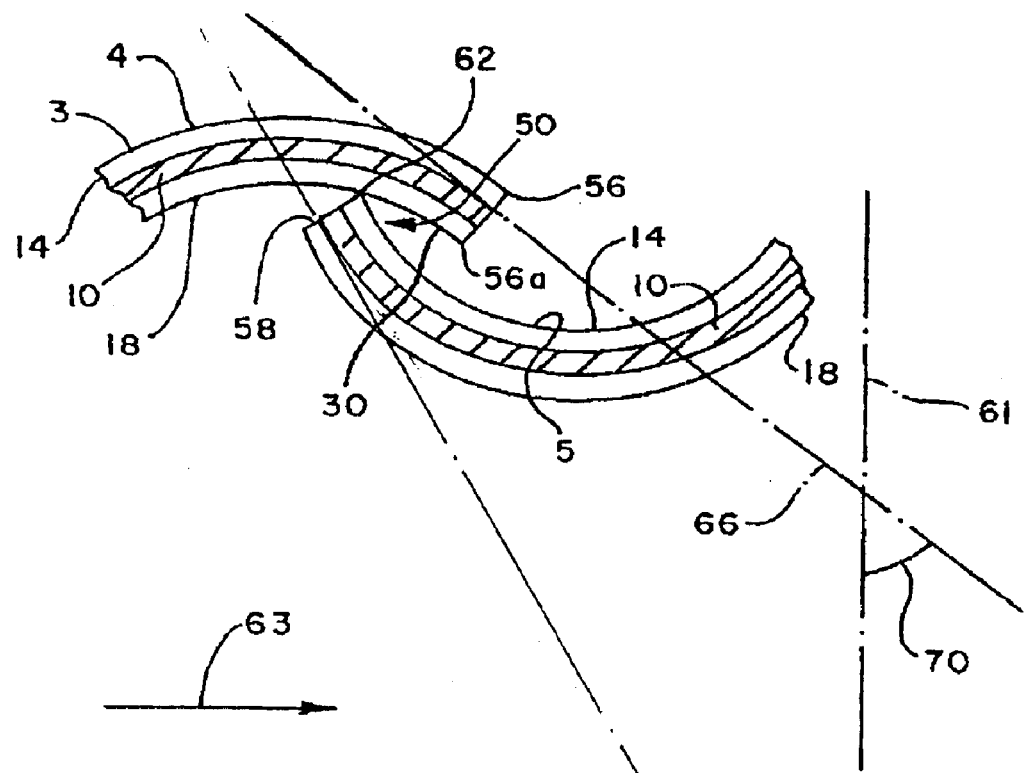
FIG. 8C is a detail view of portions of adjacent convolutions showing tangential reference lines for the preferred convolution interlock of the present invention.
Figure 8D:
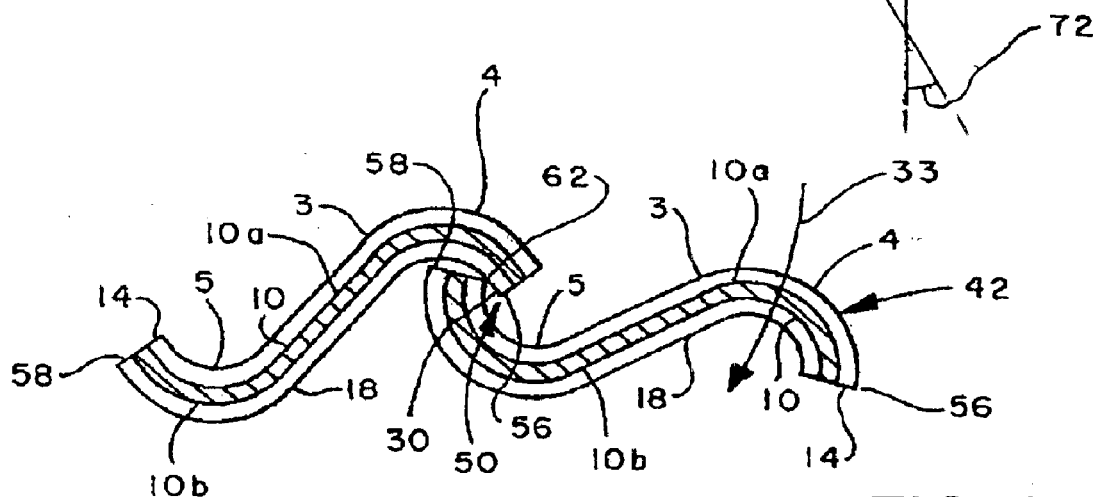
FIG. 8D is a detail view similar to FIG. 8B of the convolution interlock showing the relative positions of the convolution edges after bending of the flexible cable sheath.

However, in accordance with an important feature of the present invention, the contour of each of the convolutions 3 is configured such that the respective leading and trailing edges 56 and 58, overlap, but the adjacent convolutions 3 engage one another at point 62 only, see FIG. 8B. Contact point 62 also, of course, forms a continuous helical line along sheath strip 10 throughout the length of sheath 42. This contact point 62 between convolutions 3 is maintained when adjacent convolutions are moved relative to each other when bending the sheath 42, see FIG. 8D, such that there is no tendency to scrape the color coating 14 off of the surface 10a and potentially change the appearance of the sheath. The arrow 33 in FIG. 8D indicates the direction of movement of one convolution 3 with respect to an adjacent convolution 3 during bending of the sheath 42. In this way, the corner of the trailing edge 58 which forms the point or line contact 62 between convolutions at the conductive coating 18 remains as the only point of contact between adjacent convolutions as they are bent or rotated relative to each other about an axis, generally normal to the longitudinal axis of the sheath 42. In this way, the leading edge 56 does not contact the color coating 14 during bending of the sheath 42 and the coating 14 remains intact at all times. Moreover, an area of overlap 30, FIGS. 8B through 8D, is formed between adjacent convolutions 3 continuously, and between contact point or line 62 and corner 56a of leading edge 56, see FIG. 8C. However, area 30 may vary somewhat as one convolution is moved relative to the other, as shown in FIG. 8D. The view of FIGS. 8B through 8D are taken from the longitudinal axis of the sheath 42 and correspond to the same portion of the sheath shown partially sectioned in FIG. 1.

The improved relationship between interlocked convolutions 3 is realized by adjusting or modifying the aforementioned cable forming apparatus to provide a somewhat asymmetric convolution profile in a way such that, as shown in FIG. 8C, a line 66 tangent to a surface of strip 10 at the leading edge 56 of a convolution 3 intersects a line 61 at an angle 70, which angle is greater than an angle 72 between line 61 and a line 74 tangent to a surface of strip 10 at the trailing edge 58 the adjacent convolution, as shown. Reference line 61 is normal to the direction or path, indicated by arrow 63 in FIG. 8C, that the strip 10 follows through the sheath and cable forming apparatus mentioned herein, which path is also, typically, parallel to the longitudinal central axis of sheath 42. In this way, when sheath 42 is flexed or bent the contact point 62 moves along the inner surface of a convolution 3 toward the leading edge 56. However, the corner 56a, of leading edge 56, FIG. 8C, does not contact the color coating 14 of the adjacent convolution when the convolutions are moved relative to each other. In the illustration of FIG. 8C, the tangent lines 66 and 74 are shown tangent to the surfaces of the strip 10 at the respective leading and trailing edges 56 and 58. However, these lines are also, essentially, tangent to the surfaces of the afore-described coatings on the strip 10.

Still further, it has been recognized in accordance with the present invention that the number of convolutions per unit length of sheath 42 should, preferably, be adjusted to maximize the number of convolutions. A greater number of convolutions per unit length tends to reduce the resistance to bending of the sheath 42 and to minimize movement between adjacent convolutions, both of which are desirable. The number of convolutions per unit length of sheath which may be obtained is a function of the width of metal strip 10. Analysis has shown that, for example, 48 convolutions per foot of length of sheath 42 is desirable for a sheath having a width of 0.38 inches of the strip 10 while 34 convolution per foot is desirable for a sheath having a 0.50 inch width of the strip 10. Moreover, 24 convolutions per foot of sheath length is indicated to be desirable for a sheath having a strip width of about 0.75 inches. The above-mentioned numbers of convolutions per unit length of sheath is indicated to provide optimum results due to reducing movement between adjacent convolutions while retaining or enhancing sheath bendability, thus reducing the chance of the coating 14 being scraped off of the surface 10a. Still further, closely spaced convolutions provide for better mechanical and electrical contact between sheath 42 and fittings to which the sheath may be connected, since such contact occurs at the crowns 4 of the convolutions 3, for example.

Those skilled in the art will appreciate from the foregoing description that an improved color-coded armored cable assembly may be obtained with a sheath of the type described. It is believed that those skilled in the art will be able to practice the invention using otherwise known manufacturing and material selection processes known in the art of armored cable design and manufacturing. Advantageously, for the particular sheath 42 described hereinabove which may include the coating 18, if such coating is conductive a continuous conductive path is provided along the interior surface of the sheath. This may be advantageous for use of a sheath of the type described herein for Type AC armored cables wherein regulations require the use an internal uninsulated bond or grounding wire, such as the wire 38a, FIG. 1. Moreover, while the color coating 14, the coating 18 and the coating 21 have been described as being advantageously applied to the sheath forming metal strip before formation of the sheath convolutions, those skilled in the art will also recognize that these coatings may be applied during or even after formation of the sheath convolutions. Still further, the above-mentioned coatings may be applied using other types of application methods and coating materials, such as a powder coating. Moreover, other color-coding materials, such as ink, may be used instead of paint Although preferred embodiments of the invention have been described in detail herein, those skilled in the art will also recognize that various substitutions and modifications may be made without departing from the scope and spirit of the appended claims.

What is claimed is:

1. A color coded armored cable comprising:
  at least one elongated flexible electrical conductor; and
  a metal armor sheath enclosing said conductor, said sheath comprising an elongated metal strip formed in continuous helical interlocked convolutions;
  a continuous, non-patterned, non-conductive color coating on the entirety of the visually observable outer surface of said sheath of a color different than the natural color of the metal strip;
  retention of the continuous, non-patterned, non-conductive color coating to the entirety of the visually observable outer surface of said sheath being enhanced by:
    the outer surface of said metal strip being abraded,
    dry film thickness of said color coating being in the range of 0.3 to 0.4 mils,
    said color coating having a polyethylene based wax lubricant in a percentage per unit volume of the color coating within a range of from 0.45% to 0.55%; and
    a coating on the entirety of the inner surface of said strip.

2. The color coded armored cable set forth in claim 1 wherein the volume of said lubricant is 0.5%.

3. A color coded armored cable comprising:
  at least one elongated flexible electrical conductor; and
  a metal armor sheath enclosing said conductor, said sheath comprising an elongated metal strip formed in continuous helical interlocked convolutions;
  a continuous, non-patterned, non-conductive color coating on the entirety of the visually observable outer surface of said sheath of a color different than the natural color of the metal strip;

retention of the continuous, non-patterned color coating to the entirety of the visually observable outer surface of said sheath being enhanced by:
the outer surface of said metal strip being abraded,
dry film thickness of said color coating being in the range of 0.3 to 0.4 mils,
said color coating having a polyethylene based wax lubricant in a percentage per unit volume of the color coating within a range of from 0.45% to 0.55%; and
wherein the number of convolutions are maximized per unit length of the sheath so as to minimize the degree of movement of adjacent convolutions with respect to one another.

4. A color coded armored cable comprising:
at least one elongated flexible electrical conductor; and
a metal armor sheath enclosing said conductor, said sheath comprising an elongated metal strip formed in continuous helical interlocked convolutions;
a continuous, non-patterned, non-conductive color coating on the entirety of the visually observable outer surface of said sheath of a color different than the natural color of the metal strip;
retention of the continuous, non-patterned color coating to the entirety of the visually observable outer surface of said sheath being enhanced by:
the outer surface of said strip being abraded,
dry film thickness of said color coating being in the range of 0.3 to 0.4 mils,
said color coating having a polyethylene based wax lubricant in a percentage per unit volume of the color coating within a range of from 0.45% to 0.55%;
a conductive coating on the entirety of the inner surface of said strip; and
wherein the number of convolutions are maximized per unit length of the sheath so as to minimize the degree of movement of adjacent convolutions with respect to one another, the number of convolutions being in an inverse relationship to the width of said strip.

5. The armored cable as set forth in claim 4 wherein:
the width of said strip is in a range of from about 0.75 inches to 0.38 inches and the number of convolutions per foot of length of said sheath is in a range of from 24 convolutions per foot to 48 convolutions per foot.

6. A color coded armored cable comprising:
at least one elongated flexible electrical conductor; and
a metal armor sheath enclosing said conductor, said sheath comprising an elongated metal strip formed in continuous helical interlocked convolutions, said convolutions having a leading edge, a convex surface portion, a concave surface portion and a trailing edge;
a continuous, non-patterned, color coating on the entirety of the outer surface of said strip of a color different than the natural color of the metal, providing the sheath with said non-patterned, continuous, color over the entirety of the visually observable exterior surface of said sheath; and
said convolutions being overlapped at a leading edge of one convolution and a trailing edge of an adjacent convolution, said trailing edge being in contact with an interior surface of said convolutions at substantially a point and the geometry of said convolutions being such that bending of said sheath will cause said point contact between said convolutions to move along an inner surface of said sheath without contact between said leading edge of one convolution and an outer surface of said adjacent convolution sufficient to remove said color coating therefrom.

7. The armored cable set forth in claim 6 wherein:
said color coating is non-conductive and said inner surface of said sheath is provided with a continuous coating.

8. The armored cable set forth in claim 6 wherein:
one of a clear coat and translucent coat is applied over said color coating on the outer surface of said sheath.

9. The armored cable set forth in claim 6 wherein:
said outer surface of said strip is abraded prior to applying said color coating thereto.

10. The armored cable set forth in claim 6 wherein:
the configuration of adjacent convolutions of said sheath is such that a line tangent to a surface of said metal strip at a trailing edge of one convolution intersects a reference line normal to a longitudinal axis of said sheath at an angle which is less than an angle formed between said reference line and a line tangent to a surface of strip at a leading edge of a convolution adjacent to said one convolution.

11. The armored cable set forth in claim 6 wherein:
the width of said strip is in a range of from about 0.75 inches to 0.38 inches and the number of convolutions per foot of length of said sheath is in a range of from 24 convolutions per foot to 48 convolutions per foot.

12. The armored cable set forth in claim 6 wherein:
said color coating comprises a polyester based paint.

13. The armored cable set forth in claim 12 wherein:
the thickness of said color coating on said strip is in a range of about 0.3 mils to 0.4 mils dry film thickness.

14. The armored cable set forth in claim 13 wherein:
said outer surface of said strip is abraded prior to application of said color coating thereto.

15. The armored cable set forth in claim 13 wherein:
said color coating includes a polyethylene based wax lubricant therein in a range of about 0.45% to 0.55% by volume.

16. A color coded armored electrical cable comprising:
at least one elongated flexible electrical conductor; and
a metal sheath enclosing said conductor, said sheath comprising an elongated metal strip formed in continuous helical interlocked convolutions, said convolutions having a leading edge, a convex surface portion, a concave surface portion and a trailing edge;
a continuous, non-patterned, color coating of a color different than the natural color of the metal over the entirety of the observable portion of the exterior surface of said sheath;
said convolutions being overlapped at a leading edge of one convolution and a trailing edge of an adjacent convolution, with the contour of the metal strip convolutions designed to maintain the trailing edge of the adjacent convolution in contact with an interior surface of the said one convolution at substantially a point and such that bending of said sheath will cause said point contact between said convolutions to move along an inner surface of said sheath without contact between a leading edge of one convolution and an outer surface of an adjacent convolution sufficient to remove said color coating therefrom.

17. The color coded armored cable of claim 16 wherein:
the number of convolutions per unit length are of a number to minimize the movement between adjacent convolutions.

18. The armored cable set forth in claim 17 wherein:
the width of said strip is in a range of from about 0.75 inches to 0.38 inches and the number of convolutions per foot of length of said sheath is in a range of from 24 convolutions per foot to 48 convolutions per foot.

19. The armored cable set forth in claim 16 wherein:

said color coating includes a polyethylene based wax lubricant therein in a range of about 0.45% to 0.55% by volume.

20. A sheath for an armored electrical conductor cable, said sheath being formed of a continuous metal strip wound in helical convolutions which overlap each other at a leading edge and trailing edge of adjacent convolutions and are interlocked at a continuous line of contact, said sheath being formed by a process which comprises applying a continuous non-conductive color coating to an outer surface of said strip, applying a continuous coating to an inner surface of said strip, and forming said convolutions to have a configuration such that a line tangent to a surface of said strip at a trailing edge of one convolution intersects a reference line normal to a longitudinal axis of said sheath at an angle which is less than an angle formed between said reference line and a line tangent to a surface of said strip at a leading edge of a convolution adjacent to said one convolution.

21. The cable sheath as set forth in claim 20 wherein:

the width of said strip is in a range of from about 0.75 inches to 0.38 inches and the number of convolutions per foot of length of said sheath is in a range of from 24 convolutions per foot to 48 convolutions per foot.

22. The cable sheath set forth in claim 20 wherein:

said coating on said outer surface comprises a polyester based paint.

23. The cable sheath set forth in claim 20 wherein:

said coating on said outer surface of said strip includes a polyethylene based wax lubricant therein in a range of about 0.45% to 0.55% by volume.

24. The cable sheath set forth in claim 20 wherein:

the configuration of said convolutions is such that said cable sheath is bendable whereby said line of contact moves to change the area of overlap of one convolution with respect to an adjacent convolution without removing said color coating from said outer surface.

25. A color-coded armored cable comprising:

at least one elongated flexible electrical conductor; and a metal armor sheath enclosing said conductor, said sheath comprising an elongated metal strip having an outer surface and an inner surface, at least said outer surface being abraded, a visually continuous, non-patterned and non-conductive color coating applied to said outer surface in a dry film thickness range of about 0.3 mils to 0.4 mils, said color coating including a polyethylene based wax lubricant therein in a range of about 0.45% to 0.55% by volume, said metal strip being formed in continuous helical interlocked convolutions which may move relative to each other while retaining said color coating on said outer surface.

26. The armored cable set forth in claim 25 wherein:

said convolutions each have a leading edge, a convex surface portion, a concave surface portion and a trailing edge, respectively, and said strip is formed in a predetermined number of convolutions per unit length of said sheath while retaining said interlock between adjacent convolutions.

27. The armored cable set forth in claim 26 wherein:

said convolutions are overlapped at a leading edge of one convolution and a trailing edge of an adjacent convolution, said trailing edge being in contact with said inner surface at substantially point contact at any one position along said sheath such that bending of said sheath will cause said point contact between convolutions to move along said inner surface without contact occurring between a leading edge of a convolution and said outer surface sufficient to remove said color coating therefrom.

28. The armored cable set forth in claim 26 wherein:

the width of said strip is in a range of from about 0.75 inches to 0.38 inches and the number of convolutions per foot of length of said sheath is in a range of from about 24 to about 48.

29. The armored cable set forth in claim 25 wherein:

said color coating is substantially electrically non-conductive.

30. The armored cable set forth in claim 25 wherein:

said sheath is formed to have a maximum number of convolutions per unit length of said sheath for a given width of said strip to provide for reduction of relative movement between adjacent convolutions when said sheath is bent and to provide for retention of said color coating on said outer surface.

31. A color-coded armored cable comprising:

at least one elongated flexible electrical conductor; and a metal armor sheath enclosing said conductor, said sheath comprising an elongated metal strip having an outer surface and an inner surface, at least said outer surface being abraded, a visually continuous non-patterned substantially electrically non-conductive color coating applied to said outer surface in a dry film thickness range of about 0.3 mils to 0.4 mils, said color coating including a polyethylene based wax lubricant therein in a range of about 0.45% to 0.55% by volume, said metal strip being formed in continuous helical interlocked convolutions which may move relative to each other while retaining said color coating on said outer surface, and said sheath is formed to have a maximum number of convolutions per unit length of said sheath for a given width of said strip to provide for reduction of relative movement between adjacent convolutions when said sheath is bent and to provide for retention of said color coating on said outer surface.

* * * * *